US012113290B2

(12) United States Patent
Nagashima et al.

(10) Patent No.: US 12,113,290 B2
(45) Date of Patent: Oct. 8, 2024

(54) CROSSED-DIPOLE ANTENNA

(71) Applicant: MARUWA CO., LTD., Owariasahi (JP)

(72) Inventors: Sota Nagashima, Seto (JP); Makoto Yamaguchi, Seto (JP)

(73) Assignee: MARUWA CO., LTD., Owariasahi (JP)

( * ) Notice: Subject to any disclaimer, the term of this patent is extended or adjusted under 35 U.S.C. 154(b) by 0 days.

(21) Appl. No.: 18/014,985

(22) PCT Filed: Aug. 29, 2022

(86) PCT No.: PCT/JP2022/032339
§ 371 (c)(1),
(2) Date: Jan. 6, 2023

(87) PCT Pub. No.: WO2023/062954
PCT Pub. Date: Apr. 20, 2023

(65) Prior Publication Data

US 2024/0243479 A1 Jul. 18, 2024

(30) Foreign Application Priority Data

Oct. 15, 2021 (JP) ................................ 2021-169219

(51) Int. Cl.
*H01Q 21/24* (2006.01)
*H01Q 5/371* (2015.01)
*H01Q 19/10* (2006.01)

(52) U.S. Cl.
CPC ............. *H01Q 21/24* (2013.01); *H01Q 5/371* (2015.01); *H01Q 19/108* (2013.01)

(58) Field of Classification Search
CPC ........... H01Q 5/10; H01Q 5/371; H01Q 9/16; H01Q 19/108; H01Q 21/24; H01Q 21/26
See application file for complete search history.

(56) References Cited

U.S. PATENT DOCUMENTS 6,342,867 B1 1/2002 Bell
2010/0231478 A1* 9/2010 Leisten ................. H01Q 11/08
343/859

FOREIGN PATENT DOCUMENTS

CN 110176666 A * 8/2019 ........... H01Q 1/1207
JP 2001-257524 A 9/2001
(Continued)

OTHER PUBLICATIONS

International Search Report (ISR) for PCT/JP2022/032339 mailed Nov. 8, 2022 (5 pages).
(Continued)

*Primary Examiner* — Daniel Munoz
(74) *Attorney, Agent, or Firm* — Shumaker, Loop & Kendrick, LLP

(57) ABSTRACT

Provided is a crossed-dipole antenna that can communicate at a plurality of frequencies, and has a simple structure that can be miniaturized. The crossed-dipole antenna is provided with a core composed of a dielectric material, a reflecting plate, a first element group composed of four first elements that are formed on an outer surface of the core, extend from a central portion of the top surface of the core with a first length L1, and are arranged to be orthogonal to one another, a second element group that resonates at a second resonance frequency f2 and is composed of four second elements that are formed on the outer surface of the core, extend from the central portion of the top surface of the core with a second length L2, and are arranged to be orthogonal to one another, and feeders that transmit electric power to each element. Each of the first elements and the second elements extends along the outer surface of the core and is bent from the top surface to the side surface. The first length L1 of the first elements is less than a fourth of a first wavelength λ1 corresponding to the first resonance frequency f1, and the
(Continued)

second length L2 of the second elements is less than a fourth of a second wavelength λ2 corresponding to the second resonance frequency f2.

6 Claims, 7 Drawing Sheets

(56) References Cited

FOREIGN PATENT DOCUMENTS

| | | | |
|---|---|---|---|
| JP | 2002-11348 | A | 1/2002 |
| JP | 2008-544670 | A | 12/2008 |

OTHER PUBLICATIONS

Written Opinion for PCT/JP2022/032339 mailed Nov. 8, 2022 (6 pages).

International Preliminary Report on Patentability for PCT/JP2022/032339 mailed Apr. 16, 2024 (8 pages).

* cited by examiner

CROSSED-DIPOLE ANTENNA

TECHNICAL FIELD

The present invention relates to a crossed-dipole antenna.

BACKGROUND ART

Conventionally, crossed-dipole antennas are mainly used in applications suitable for the use of circularly polarized waves, such as in GPS in vehicles and ships, and various fixed stations. Crossed-dipole antennas are configured to generate circularly polarized waves, by arranging four antenna elements to be orthogonal and to extend from a center in four directions in the form of a cross, such that the phase difference is 90 degrees.

For example, Patent Document 1 discloses a crossed-dipole antenna that has a purpose of improving the axial ratio of circularly polarized waves. The numerals of Patent Document 1 are indicated in parentheses in this paragraph. The crossed-dipole antenna (1) is composed of two dipole antennas arranged to be approximately orthogonal and a reflecting plate (6). The reflecting plate (6) is substantially circular and has a diameter (D), which, when the center frequency in the frequency band to be used is λ, is approximately λ/2 to λ. The two dipole antennas arranged to be approximately orthogonal are composed of a first inverted U-shaped dipole antenna and a second inverted U-shaped dipole antenna that are arranged to be approximately orthogonal. The first inverted U-shaped dipole antenna is composed of a dipole element (2*a*) and a dipole element (2*b*), each of which is bent into an inverted U-shape, and the second inverted U-shaped dipole antenna is composed of a dipole element (2*c*) and a dipole element (2*d*), each of which is bent into an inverted U-shape. The lengths of the dipole elements (2*a*) to (2*d*) are set to about λ/4. In other words, the first inverted U-shaped dipole antenna and the second inverted U-shaped dipole antenna are configured as half-wavelength dipole antennas. In addition, in the crossed-dipole antenna (1), a gap L1 between one end of the dipole elements (2*a*) to (2*d*) and the reflecting plate (6) is set to be about λ/4.

Patent Document 1: Japanese Unexamined Patent Application Publication No. 2001-257524

SUMMARY

In the crossed-dipole antenna described in Patent Document 1, there was a need to set the length of the dipole elements of the dipole antennas to λ/4 and to set the gap between the dipole elements at the top of the antenna and the reflecting plate to λ/4, according to the frequency band to be used. There was therefore a problem in that when using the crossed-dipole antenna in a frequency band of about 1 GHz to 1.5 GHz for satellite communication or the like, λ becomes several hundred millimeters, necessitating a large size of the antenna itself. A further problem with the crossed-dipole antenna described in Patent Document 1 is that the antenna is only compatible with one frequency band to be used.

The present invention solves the aforementioned problems, and a purpose thereof is to provide a crossed-dipole antenna that is compatible with two or more frequency bands, and has a structure that can be miniaturized.

A crossed-dipole antenna according to an embodiment of the present invention is provided with a core of a columnar shape having a top surface, a side surface, and a bottom portion, the core being composed of a dielectric material, a reflecting plate arranged at the bottom portion of the core, a first element group that resonates at a first resonance frequency f1 and is composed of four first elements that are formed on an outer surface of the core, extend from a central portion of the top surface of the core with a first length L1 and a first width W1, and are arranged to be orthogonal to one another, a second element group that resonates at a second resonance frequency f2 and is composed of four second elements that are formed on the outer surface of the core, extend from the central portion of the top surface of the core with a second length L2 and a second width W2, and are arranged to be orthogonal to one another and so as not to overlap with the first elements, and feeders that transmit electric power to each element in the first and second element groups, wherein each of the first elements and the second elements extends along the outer surface of the core and is bent from the top surface to the side surface, the first length L1 is less than a fourth of a first wavelength λ1 corresponding to the first resonance frequency f1, and the second length L2 is less than a fourth of a second wavelength λ2 corresponding to the second resonance frequency 12.

In other words, the crossed-dipole antenna according to the present invention has a first element group resonating at a first resonance frequency f1 and a second element group resonating at a second resonance frequency f2 formed on the core, and is thus configured to be compatible with at least two frequency bands. In addition, the first element group and the second element group be formed on an outer surface of a core made of a dielectric material, whereby the first length L1 is less than a fourth of the first wavelength λ1 corresponding to the first resonance frequency f1, and the second length L2 is less than a fourth of the second wavelength λ2 corresponding to the second resonance frequency f2. Further, by having each of the first elements and the second elements extends along the outer surface of the core and is bent from the top surface to the side surface, the crossed-dipole antenna can be miniaturized than conventional ones. Accordingly, the crossed-dipole antenna according to the present invention realizes both a smaller structure and compatibility with a plurality of frequency bands.

In a further embodiment of the present invention, each of the first elements is electrically connected to one adjacent second element at an end portion on the central portion side. It is thus possible for the first element and the second element to share one feeder, allowing for the number of feeders to be reduced from eight to four. As a result, the crossed-dipole antenna can be miniaturized.

In a further embodiment of the present invention, the dielectric material has a permittivity of 2 to 78. By employing a dielectric material with a permittivity of 2 to 78, the lengths L1, L2 of the elements can be shortened by 50% or more.

In a further embodiment of the present invention, the first length L1 is less than one eighth of the first wavelength λ1, and the second length L2 is less than one eighth of the second wavelength λ2.

In a further embodiment of the present invention, a distance between the top surface of the core and the reflecting plate is less than a fourth of the first wavelength λ1 and less than a fourth of the second wavelength λ2. In other words, by having the first elements and the second elements be formed on the outer surface of the core made of a dielectric material, the optimal distance for the gain between the top surface of the core (the base ends of the elements)

and the reflecting plate is made shorter, whereby the crossed-dipole antenna can be miniaturized.

In a further embodiment of the present invention, the invention is further provided with a third element group that resonates at a third resonance frequency and is composed of four third elements that are formed on the outer surface of the core, extend from the central portion of the top surface of the core with a third length L3 and a second width W3, and are arranged to be orthogonal to one another and so as not to overlap with the first elements and the second elements. In other words, the crossed-dipole antenna according to the present invention is compatible with three or more frequency bands.

The present invention provides a crossed-dipole antenna that can communicate at a plurality of frequencies, and has a structure that can be miniaturized.

DETAILED DESCRIPTION

Figure 1:
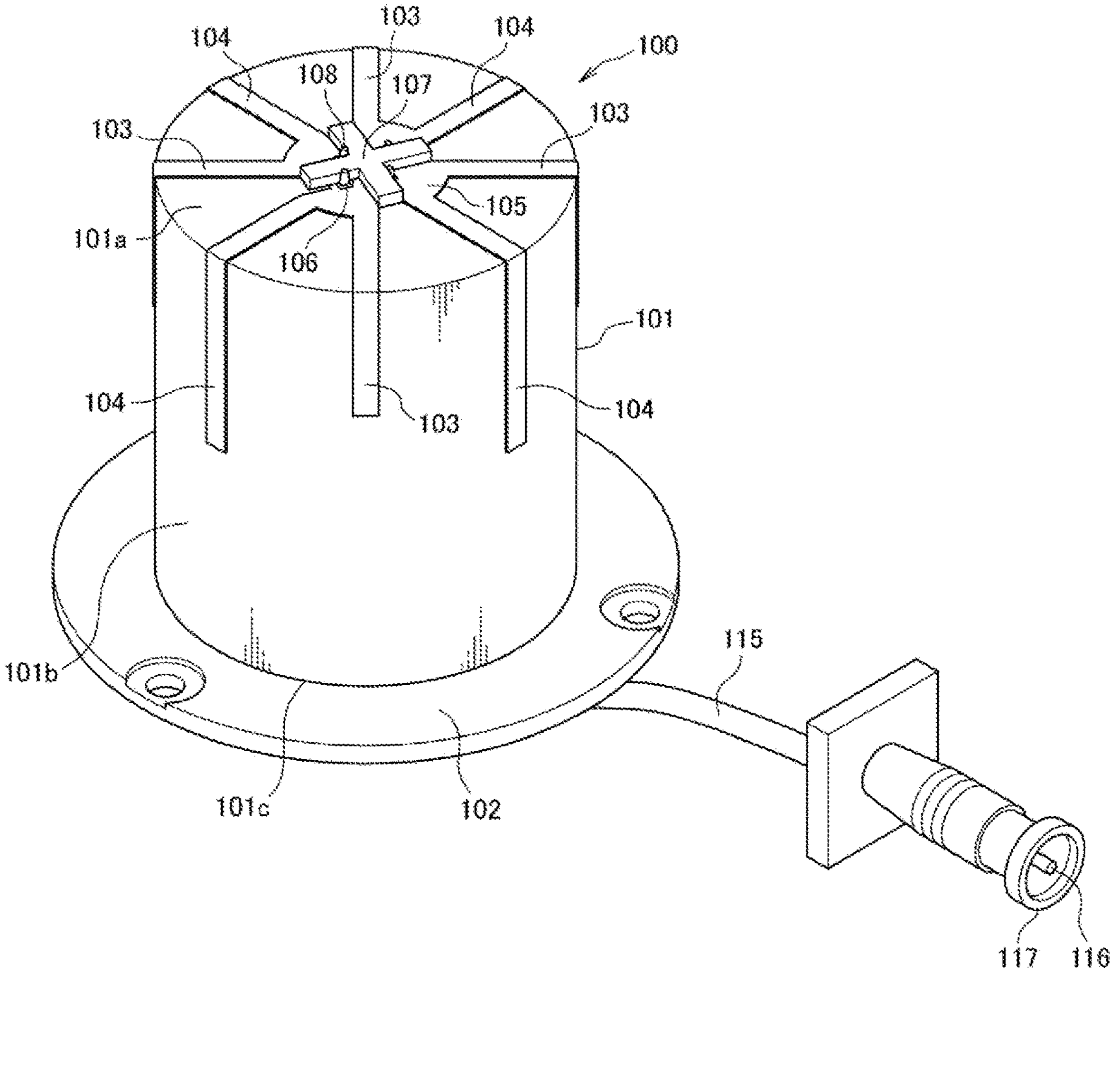
FIG. 1 is a schematic perspective view of a crossed-dipole antenna according to an embodiment of the present invention.

An embodiment of the present invention is described below as an example. It should be noted that the below description is not intended to limit the present invention. In addition, the shapes illustrated in the drawings referenced in the below description are conceptual or schematic representations for describing preferred shapes and dimensions, and the proportions thereof do not necessarily match the actual proportions. In other words, the present invention is not limited to the proportions illustrated in the drawings.

A crossed-dipole antenna 100 according to the present embodiment is configured to be used in a first frequency band that includes a first resonance frequency f1 (1575 MHz) as an approximate center frequency, and in a second frequency band that includes a second resonance frequency (1200 MHz) as an approximate center frequency. A first wavelength λ1 corresponding to the first resonance frequency f1 is 190 mm, and a second wavelength λ2 corresponding to the second resonance frequency f2 is 250 mm. The first frequency band may be configured to a range of 1553 MHz to 1605 MHz, so as to accommodate three frequency signals including, for example, a 1575 MHz signal, a 1553-1561 MHz signal, and a 1605 MHz signal. The second frequency band may be configured to a range of 1176 MHz to 1227 MHz, so as to accommodate two frequency signals including, for example, a 1227 MHz signal and a 1176 MHz signal. The values of the first resonance frequency f1 and the second resonance frequency f2 may be selected or changed as appropriate depending on the communication application, etc.

Figure 2:
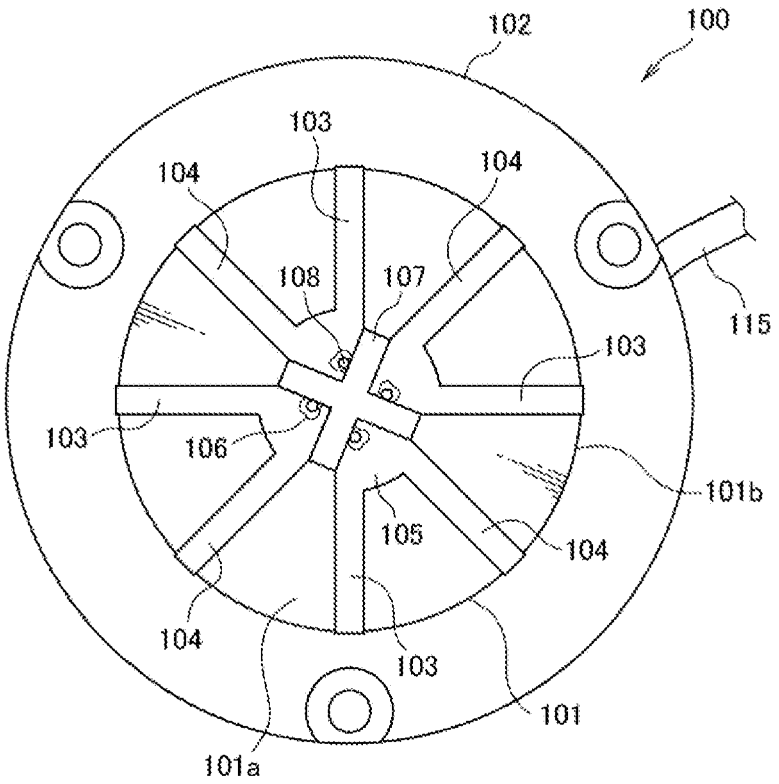
FIG. 2 is a planar view of the crossed-dipole antenna illustrated in FIG. 1.
Figure 3:
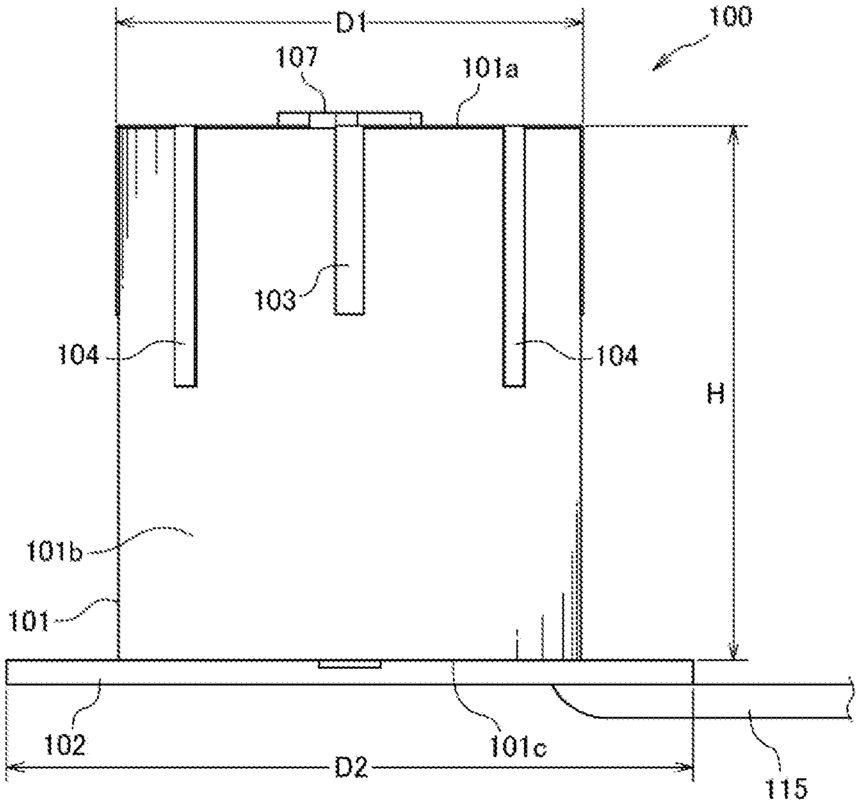
FIG. 3 is a front view of the crossed-dipole antenna illustrated in FIG. 1.
Figure 4:
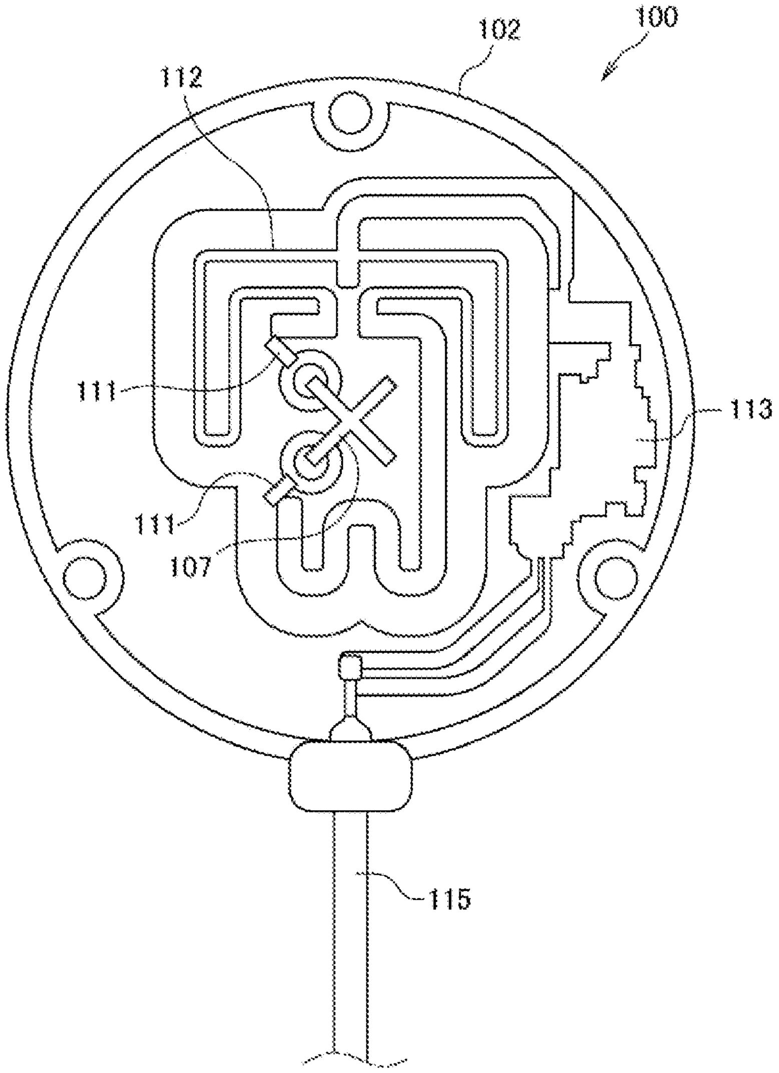
FIG. 4 is a bottom view of the crossed-dipole antenna illustrated in FIG. 1.

FIG. 1 is a schematic perspective view of the crossed-dipole antenna 100 according to an embodiment of the present invention, FIG. 2 is a planar view of the crossed-dipole antenna 100, FIG. 3 is a front view of the crossed-dipole antenna 100, and FIG. 4 is a bottom view of the crossed-dipole antenna 100.

The crossed-dipole antenna 100 according to the present embodiment, as illustrated in FIGS. 1 to 4, is provided with a core 101, a reflecting plate 102 arranged at a bottom portion 101*c* of the core 101, a first element group composed of four first elements 103 that are formed at an outer surface (top surface 101*a* and side surface 101*b*) of the core 101 and substantially orthogonal, a second element group composed of four second elements 104 that are formed at the outer surface of the core 101 and substantially orthogonal, and a feeder 108 that transmits electric power to the elements 103, 104 of the first and second element groups. Each component is described below.

The core 101 has a top surface 101*a*, a side surface 101*b*, and a bottom portion 101*c*, and has a columnar shape extending in an axial direction. In the present invention, the core is not limited to a columnar shape, but may have other shapes such as a rectangular pillar shape, etc. The core 101 is hollow, and a through-hole is formed in a central portion of the top surface 101*a* thereof. At the central portion of the top surface 101*a* of the core 101, a base end of a core member 107 is fixed in the through-hole. The core member 107 is constituted by any hard resin substrate, such as FR-4, PTFE, etc., has a cross-shaped cross-section that is continuous in the axial direction, and is arranged along the axial center of the core 101. Four feeders 108 are respectively arranged at the four intersecting portions of the cross-sectional cross shape of the core member 107. In other words, the core member 107 may guide the four feeders 108 from the top surface 101*a* to the bottom portion 101*c* in a state of electrically insulating the four feeders 108 by a plurality (four) of partition walls. In addition, the base end portions and the tip end portions of the first elements 103 and the second elements 104 are respectively attached to the top surface 101*a* and the side surface 101*b* of the core 101. At the central portion of the top surface 101*a*, the feeders 108 are electrically connected to the first elements 103 and the second elements 104.

As illustrated in FIG. 3, the core 101 is a column having a diameter D1 and a height H. The diameter D1 is the outer diameter of the top surface 101*a*. The height H is the length of the side surface 101*b* in the axial direction, and represents the distance from the top surface 101*a* (the base end portions of the elements 103, 104) to the bottom portion 101*c* (the reflecting plate 102). The size of the crossed-dipole antenna 100 is mainly determined by the diameter D1 and the height H of the core 101. In the present embodiment, the core diameter D1 is 30 mm, and the core height H is 25 mm.

The core 101 is made of a dielectric material. Preferably, the core 101 is formed by a ceramic material. In the present embodiment, the ceramic material is, although not so limited, a sintered body wherein $MgO—SiO_2$ is the main component, having a permittivity of about 38. The permittivity of the dielectric material of the core 101 is preferably 2 to 78. By setting the permittivity of the dielectric material to 2 to 78, the lengths of the elements when arranged on a dielectric material surface can be shortened by about 50% or more compared to when arranged in mid-air (not on a dielectric material surface) for the same resonance frequency, which allows for the crossed-dipole antenna 100 to be miniaturized. On the other hand, when the permittivity is less than 2, the effect of allowing for a smaller size is reduced. It is also found that when the permittivity is more than 78, the frequency bandwidth becomes narrow, eliminating compatibility with a plurality of frequencies, and dielectric loss increases, such that a desired gain cannot be achieved.

The reflecting plate 102 is integrally joined with the bottom portion 101*c* of the core 101. The reflecting plate 102 is a disc having a diameter D2 (greater than D1), and is provided so as to cover the bottom portion 101*c* of the core 101. The diameter D2 may be selected from a minimum size capable of forming a high-frequency circuit such as a low noise amplifier, or any given size. The reflecting plate 102 reflects circularly polarized waves going downward in the axial direction back upward in the axial direction, and is composed of a metal plate or the like in order to increase the gain. In general, when there is no dielectric material such as the core 101 present between the reflecting plate 102 and the elements 103, 104 of the antenna, the reflection is maximized and the gain is optimal when the distance between the elements 103, 104 and the reflecting plate 102 is λ/4. In the present embodiment, the distance between the elements 103, 104 and the reflecting plate 102 is defined by the core height H (25 mm), such that the gain of the second resonance frequency 12 is maximized. Because of the permittivity (38) of the dielectric material, the core height H (25 mm) is smaller than a fourth (47.5 mm) of the first wavelength λ1 and a fourth (62.5 mm) of the second wavelength λ2. In other words, the core 101 made of the dielectric material enables the distance between the elements 103, 104 and the reflecting plate 102 to be shortened, whereby the crossed-dipole antenna 100 can be miniaturized.

A through-hole is formed in the center of a bottom surface of the reflecting plate 102, and a tip end of the core member 107 is fixed in the through-hole. At the bottom surface of the reflecting plate 102, there are provided baluns 111 for conversion between an unbalanced circuit and a balanced circuit, a 90-degree phase distributor 112 for shifting the phases of the orthogonal elements by 90 degrees, and a low noise amplifier (LNA) 113 for amplifying signals from the antenna elements. The bottom surface of the reflecting plate 102 is provided with two baluns 111, 111, and two feeders 108, 108 connected to two serially arranged elements 103, 103 (or 104, 104) form one set that is connected to one balun 111. The two sets of feeders 108 are respectively connected to two connection points at one end side of the 90-degree phase distributor via the two baluns 111. A first connection point of the low noise amplifier (LNA) 113 is connected to a connection point at the other end side of the 90-degree phase distributor 112. A second connection point of the low noise amplifier (LNA) 113 is connected to a cable 115 via a conducting wire. The cable 115 is a coaxial cable, an end of which is provided with a signal terminal 116 connected to an internal conducting wire, and a ground terminal 117 connected to a peripheral conductor.

The first element group is configured to resonate at the first resonance frequency f1 (1575 MHZ) to generate a circularly polarized wave. The first element group is formed on the outer surface (top surface 101*a* and side surface 101*b*) of the core 101, extends approximately linearly from the central portion of the top surface 101*a* of the core 101 with a first length L1 and a first width W1, and is composed of four first elements 103 that are arranged to be orthogonal to one another. Each first element 103 is composed of an elongated linear conducting plate (copper plate), and is formed attached to the outer surface of the core 101. The base end of each first element 103 is arranged at the central portion of the top surface 101*a* of the core 101, and is electrically connected to a feeder 108. In addition, each first element 103 extends along the outer surface of the core 101 and is bent from the top surface 101*a* to the side surface 101*b*. The tip end of each first element 103 is positioned near the center in the axial direction of the side surface 101*b* of the core 101.

The second element group is configured to resonate at the second resonance frequency f2 (1200 Milz) to generate a circularly polarized wave. The second element group is formed on the outer surface (top surface 101*a* and side surface 101*b*) of the core 101, extends approximately linearly from the central portion of the top surface 101*a* of the core 101 with a second length L2 and a second width W2, and is composed of four second elements 104 that are arranged to be orthogonal to one another. Each second element 104 is composed of an elongated linear conducting plate (copper plate), and is formed attached to the outer surface of the core 101. The base end of each second element 104 is arranged at the central portion of the top surface 101*a* of the core 101, and is electrically connected to a feeder 108. In addition, each second element 104 extends along the outer surface of the core 101 and is bent from the top surface 101*a* to the side surface 101*b*. The tip end of each second element 104 is positioned near the center in the axial direction of the side surface 101*b* of the core 101. Here, the second elements 104 are arranged at positions shifted by 45 degrees in the circumferential direction, so as not to overlap with the first elements 103.

In addition, each first element 103 is electrically connected to one adjacent second element 104 at an end portion on the central portion side, via a connecting portion 105. Adjacent to the connecting portion 105 there is provided a joint 106 to which the feeder 108 is electrically joined. The joint 106 is a location where the feeder 108 and the connecting portion 105 are soldered together. In other words, a pair of a first element 103 and a second element 104 may be powered simultaneously by one shared feeder 108. Thus, in the crossed-dipole antenna 100 according to the present embodiment, it is sufficient that four feeders 108 be wired to power four pairs of first elements 103 and second elements 104.

Figure 5:
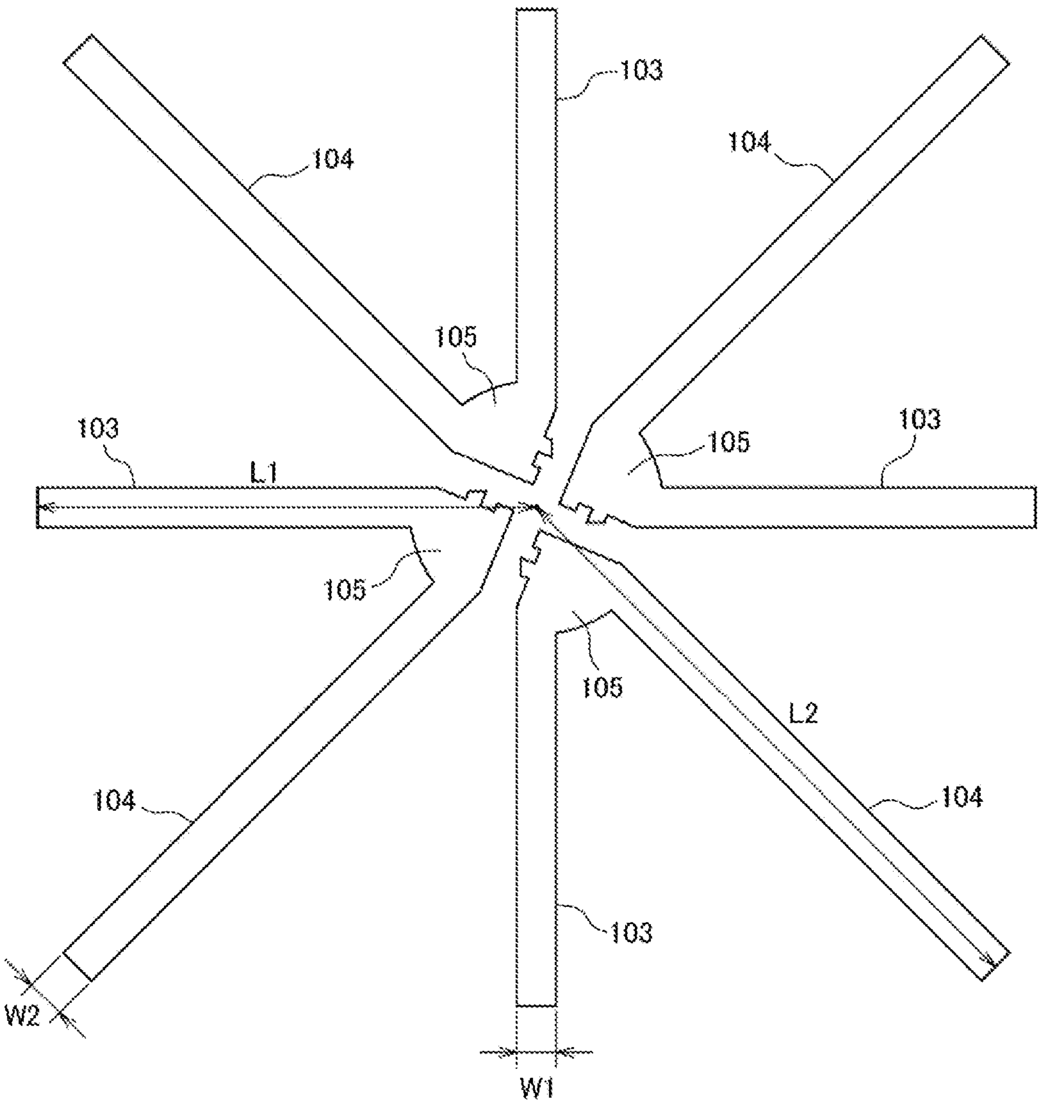
FIG. 5 is a projection in plan view of a first and a second element of the crossed-dipole antenna illustrated in FIG. 1.

Next, the length properties of the first elements 103 and the second elements 104 will be described. FIG. 5 is a schematic view illustrating the first elements 103 and the second elements 104 attached to the top surface 101*a* and the side surface 101*b* of the core 101 projected on a plane. As illustrated in FIG. 5, the first length L1 is the shortest distance from the center of the core 101 to the tip of the first element 103, and the length L2 is the shortest distance from the center of the core 101 to the tip of the second element 104. Meanwhile, the width across the corners from the center to the tips of the elements 103, 104 is the longest distance. By increasing the widths W1, W2, the longest distance also increases. In general, when four dipole antennas are arranged to be orthogonal in mid-air, each element needs to have a length of λ/4. Applying this to the wavelengths λ1, λ2 of the first and second resonance frequencies f1, f2 according to the present embodiment, the required element lengths are respectively 47.5 mm and 62.5 mm. By contrast, in the present embodiment, the elements 103, 104 are formed on the surface of the core 101 that is made of a dielectric material having a permittivity of 38, whereby the first length L1 of the first element 103 can be reduced to 21.5 mm, and the second length L2 of the second element 104 can be reduced to 24 mm. Therefore, the first length L1 is less than one eighth of the first wavelength λ1, and the second length L2 is less than one eighth of the second wavelength λ2. In other words, the lengths of the elements 103, 104 on the surface of the core 101 can be shortened by about 50% or more, allowing for the crossed-dipole antenna 100 to be miniaturized.

The crossed-dipole antenna 100 according to the embodiment configured as described above has been confirmed to exhibit the desired gain performance in both a first frequency band of 1553 MHz to 1605 MHz and a second frequency band of 1176 MHz to 1227 MHz.

Figure 6:
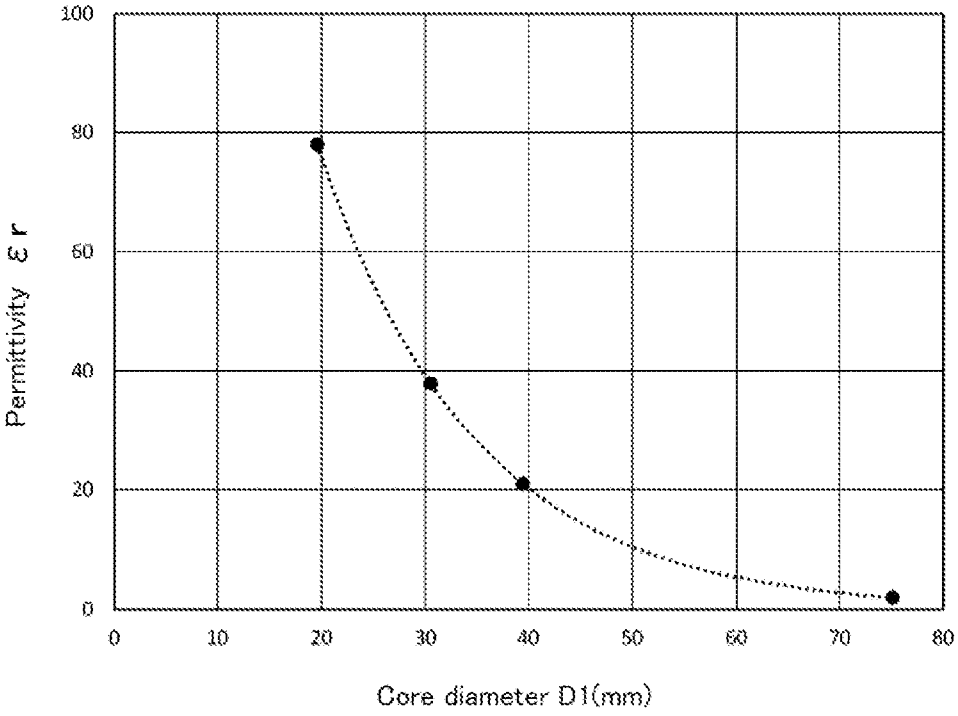
FIG. 6 is a graph illustrating a relationship between an antenna core diameter (D1) and a permittivity (er) of the crossed-dipole antenna according to the present embodiment.

FIG. 6 is a graph illustrating the relationship between the permittivity (εr) and the diameter (D1) of the crossed-dipole antenna 100 confirmed to exhibit the desired gain performance. The desired gain performance described here satisfies the condition (standard) wherein the change rate of the gain in the first frequency band of 1553 MHz to 1605 MHz is 7% or less and the change rate of the gain in the second frequency band of 1176 MHz to 1227 MHz is 48% or less. According to FIG. 6, it is confirmed that with a permittivity acceptable for the frequency bandwidth and the dielectric loss is about 78, the diameter D1 can be set to 20 mm, allowing for a smaller crossed-dipole antenna 100 to be obtained. Meanwhile, it is also confirmed that when the permittivity is increased in order to provide a wider margin for the frequency bandwidth and the dielectric loss, a permittivity of about 21 requires a core diameter D1 of 40 mm, and a permittivity of 2 requires a core diameter D1 of about 75 mm. In other words, it is confirmed that when the permittivity of the dielectric material is set to a range of 2 to 78 in order to ensure a frequency bandwidth that is compatible with a plurality of frequencies, a small cross-dipole antenna 100, having a diameter D1 representing the antenna size of 20 mm to 75 mm, can be obtained.

Accordingly, the crossed-dipole antenna 100 according to the present invention can be used in two or more frequency bands, and has a structure that can be miniaturized.

The present invention is not limited to the embodiment described above, but may be practiced in various embodiments and variants within the technical scope of the present invention.

Figure 7:
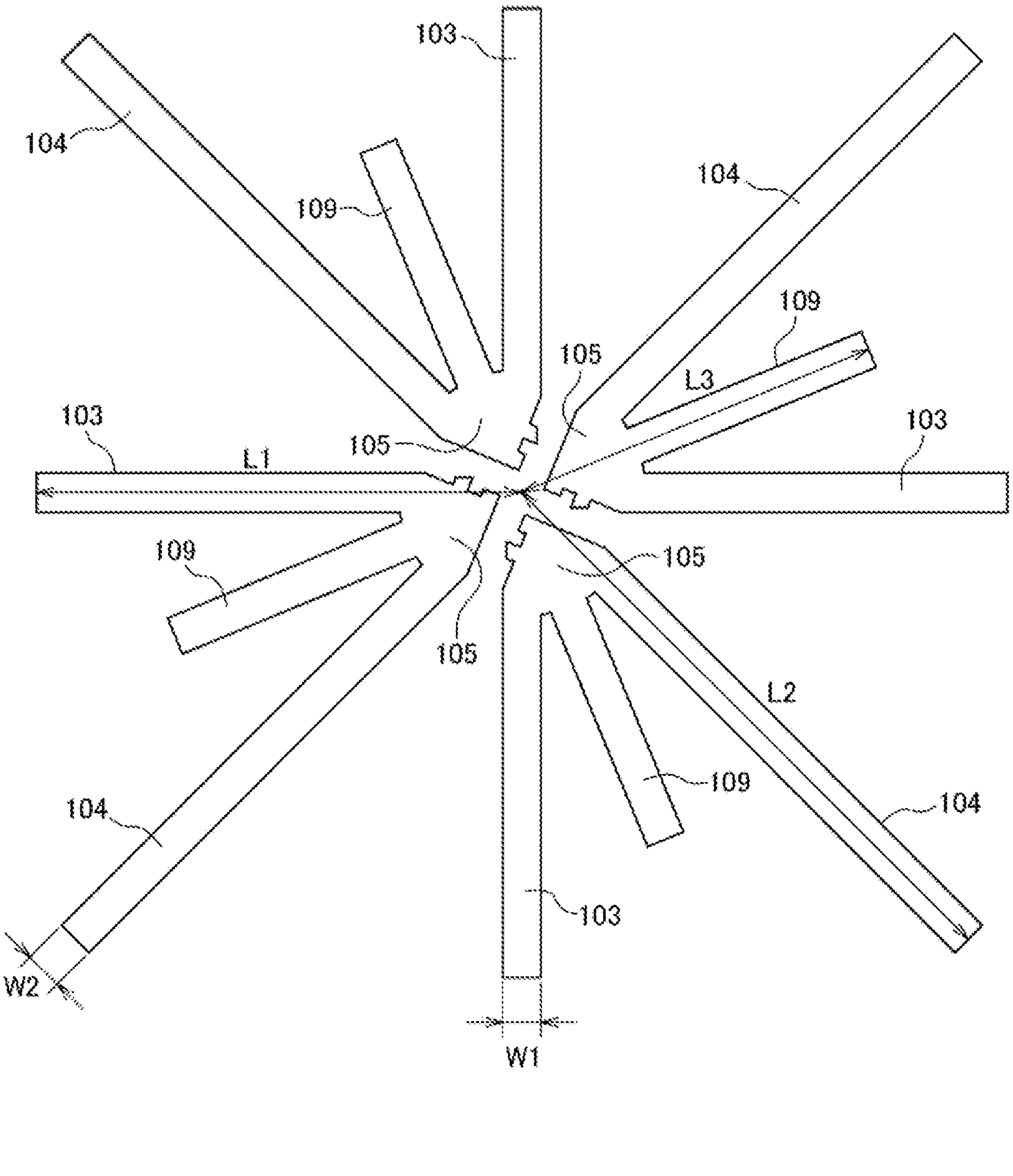
FIG. 7 is a projection in plan view of first to third elements of a crossed-dipole antenna according to a variant of the present invention.

Variant (1) The crossed-dipole antenna according to the present invention is configured to be compatible with two frequency bands to be used, but the present invention may be configured to be compatible with N (equal to or more than three) frequency bands to be used. FIG. 7 is a projection in plan view of first elements 103, second elements 104, and third elements 109 of a cross-dipole antenna configured to be compatible with three frequency bands to be used. In other words the crossed-dipole antenna may be further provided with a third element group that resonates at a third resonance frequency and is composed of four third elements that are formed on the outer surface of the core, extend from the central portion of the top surface of the core with a third length L3 and a third width W3, and are arranged to be orthogonal to one another and so as not to overlap with the first elements and the second elements.

The present invention is not limited to the embodiment and the variant described above, but may be practiced in various modes within the technical scope to which the present invention belongs. In other words, the present invention may be modified or altered by a person skilled in the art without departing from the technical scope of the invention.

DESCRIPTION OF THE REFERENCE NUMERAL

100 Crossed-dipole antenna
101 Core
101*a* Top surface
101*b* Side surface
101*c* Bottom portion
102 Reflecting plate
103 First element
104 Second element
105 Connecting portion
106 Joint
107 Core member
108 Feeder line
109 Third element
111 Balun
112 Phase distributor
113 Low noise amplifier (LNA)
115 Cable
116 Signal terminal
117 Ground terminal
L1 First length
L2 Second length
W1 First width
W2 Second width
D1 Diameter (core diameter)
D2 Diameter (reflecting plate diameter)
H Height

The invention claimed is:

1. A crossed-dipole antenna comprising:

a core of a columnar shape having a top surface, a side surface, and a bottom portion, the core being composed of a dielectric material;

a reflecting plate arranged at the bottom portion of the core;

a first element group that resonates at a first resonance frequency f1 and is composed of four first elements that are formed on an outer surface of the core, extend from a central portion of the top surface of the core with a first length L1 and a first width W1, and are arranged to be orthogonal to one another;

a second element group that resonates at a second resonance frequency f2 and is composed of four second elements that are formed on the outer surface of the core, extend from the central portion of the top surface of the core with a second length L2 and a second width W2, and are arranged to be orthogonal to one another and so as not to overlap with the first elements; and feeders that transmit electric power to each element in the first and second element groups, wherein each of the first elements and the second elements extends along the outer surface of the core and is bent from the top surface to the side surface, the first length L1 is less than a fourth of a first wavelength 21 corresponding to the first resonance frequency f1, and the second length L2 is less than a fourth of a second wavelength 22 corresponding to the second resonance frequency f2.

2. The crossed-dipole antenna according to claim 1, wherein each of the first elements is electrically connected to one adjacent second element at an end portion on the central portion side.

3. The crossed-dipole antenna according to claim 1, wherein the dielectric material has a permittivity of 2 to 78.

4. The crossed-dipole antenna according to claim 1, wherein the first length L1 is less than one eighth of the first wavelength λ, and the second length L2 is less than one eighth of the second wavelength λ2.

5. The crossed-dipole antenna according to claim 1, wherein a distance between the top surface of the core and the reflecting plate is less than a fourth of the first wavelength λ1 and less than a fourth of the second wavelength λ2.

6. The crossed-dipole antenna according to claim 1, further comprising a third element group that resonates at a third resonance frequency and is composed of four third elements that are formed on the outer surface of the core, extend from the central portion of the top surface of the core with a third length L3 and a second width W3, and are arranged to be orthogonal to one another and so as not to overlap with the first elements and the second elements.

* * * * *